United States Patent
Chaney et al.

(10) Patent No.: US 10,761,860 B2
(45) Date of Patent: *Sep. 1, 2020

(54) DYNAMICALLY LOADED PLUGIN ARCHITECTURE

(71) Applicant: Bitvore Corp., Los Angeles, CA (US)

(72) Inventors: Alan Chaney, Simi Valley, CA (US); Clay Cover, Anaheim, CA (US); Gregory A. Bolcer, Yorba Linda, CA (US); Andrey Mogilev, Novosibirsk (RU)

(73) Assignee: Bitvore Corp., Los Angeles, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/263,036

(22) Filed: Jan. 31, 2019

(65) Prior Publication Data

US 2019/0235883 A1   Aug. 1, 2019

Related U.S. Application Data

(63) Continuation of application No. 15/623,500, filed on Jun. 15, 2017, now Pat. No. 10,216,528, which is a continuation of application No. 14/719,402, filed on May 22, 2015, now Pat. No. 9,720,711, which is a continuation of application No. 14/208,437, filed on Mar. 13, 2014, now Pat. No. 9,075,691.

(60) Provisional application No. 61/784,542, filed on Mar. 14, 2013.

(51) Int. Cl.
*G06F 9/44* (2018.01)
*G06F 9/445* (2018.01)
*G06F 8/65* (2018.01)
*G06F 8/71* (2018.01)

(52) U.S. Cl.
CPC ............ *G06F 9/44526* (2013.01); *G06F 8/65* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 7,519,976 B2 * | 4/2009 | Blevins | G06Q 10/06 719/328 |
| 9,075,691 B2 | 7/2015 | Chaney et al. | |
| 9,720,711 B2 | 8/2017 | Chaney et al. | |

(Continued)

OTHER PUBLICATIONS

Int'l Search Report and Written Opinion Appln. No. PCT/US2014/25494, dated Feb. 3, 2015 (8 pgs).

(Continued)

*Primary Examiner* — Anna C Deng
(74) *Attorney, Agent, or Firm* — McAndrews, Held & Malloy, Ltd.

(57) ABSTRACT

A method and architecture for using dynamically loaded plugins is described herein. The dynamically loaded plugin architecture comprises a parent context and a plugin repository. The parent context may define one or more reusable software components. The plugin repository may store one or more plugins. When a plugin is loaded, a child context may be created dynamically. The child context is associated with the plugin and inherits the one or more reusable software components from the parent context.

19 Claims, 6 Drawing Sheets

(56) References Cited

U.S. PATENT DOCUMENTS

2006/0074975 A1* 4/2006 Tunar ................ G06F 3/0631
2013/0318512 A1* 11/2013 Kuppala ............ G06F 9/44526
717/166

OTHER PUBLICATIONS

Int'l Preliminary Report on Patentability, Appln. No. PCT/US2014/025494 dated Sep. 24, 2015 (8 pgs).

* cited by examiner

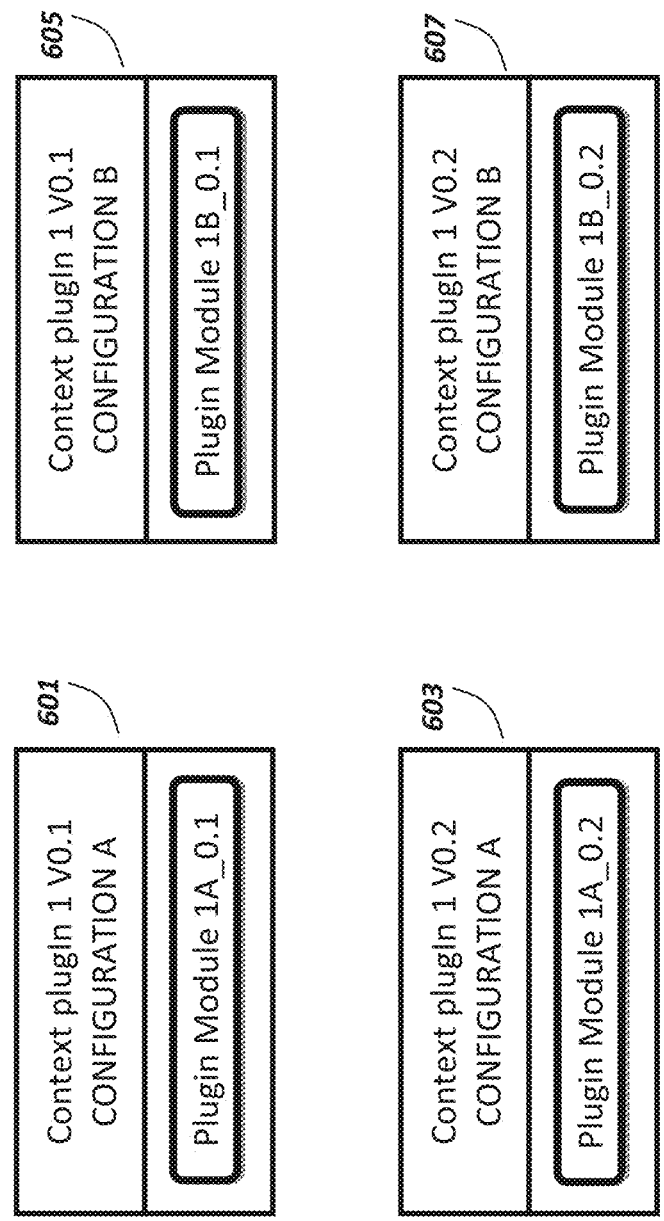

DYNAMICALLY LOADED PLUGIN ARCHITECTURE

CROSS-REFERENCE TO RELATED APPLICATIONS INCORPORATION BY REFERENCE

This application is a continuation of U.S. patent application Ser. No. 15/623,500, filed Jun. 15, 2017, which is a continuation of U.S. patent application Ser. No. 14/719,402, filed May 22, 2015 (now U.S. Pat. No. 9,720,711), which is a continuation of U.S. patent application Ser. No. 14/208,437, filed Mar. 13, 2014 (now U.S. Pat. No. 9,075,691), which claims priority to U.S. provisional patent application No. 61/784,542, filed Mar. 14, 2013. Each of the above-referenced United States patent applications is hereby incorporated herein by reference in its entirety.

FIELD

The disclosure relates to the field of software engineering. In particular, but not exclusively, this disclosure relates to a dynamically loaded plugin architecture.

BACKGROUND

In software engineering, a plugin is a set of software components that adds specific abilities to a larger software application. Plugins may enable customizing the functionality of a host application. The host application may provide services which the plugin can use, including a way for plugins to register themselves with the host application and a protocol for the host application to exchange data with plugins. When a plugin registers, the existence of the plugin is recorded, and a unique identifier may be associated with the plugin. Plugins depend on the services provided by the host application and do not usually work by themselves. Conversely, the host application operates independently of the plugins, and when the invention described in this disclosure is implemented, it is possible for end-users to add and update plugins without needing to make changes to the host application.

In software engineering, an application context refers to the minimal set of data used by a task that defines the initial configuration and execution state of that task (e.g., a process or a job) that must be saved to allow the task to be interrupted and restarted. The word "context" may be used interchangeably to refer to two different, but related, concepts: 1) information "carried around" within the system describing the current state of elements or processes (e.g., a web request carries information describing the message, and in a typical web framework this is called the "Request Context"); or 2) the data structure used to hold this information. The software container that holds the context for the Request Context may also be called the Request Context.

There are several disadvantages if more than one plugin uses the same application context. For example, plugins may not be properly isolated from each other, and dynamic loading of plugins may not be supported.

Further limitations and disadvantages of conventional and traditional approaches will become apparent to one of skill in the art, through comparison of such systems with the present invention as set forth in the remainder of the present application with reference to the drawings.

BRIEF SUMMARY

The present disclosure is directed to methods and architectures aimed at reducing or eliminating the above problems with the prior art. In particular, but not exclusively, aspects of the disclosure are directed to a dynamically loaded plugin architecture.

One example embodiment of the dynamically loaded plugin architecture comprises a parent context and a plugin repository. The parent context may define one or more reusable software components. The plugin repository may store one or more plugins. When a plugin is loaded, a child context is created dynamically. The child context is associated with the plugin and inherits the one or more reusable software components from the parent context.

In another example embodiment of the dynamically loaded plugin architecture, another child context is created dynamically when the plugin is loaded a second time. Thereby, the plugin may run concurrently as two independent versions.

In another example embodiment of the dynamically loaded plugin architecture, the parent context may be defined by an application programming interface.

In another example embodiment of the dynamically loaded plugin architecture, a second child context may inherit the one or more reusable software components from the parent context or from the first child context when the second plugin is loaded.

In the aforementioned example embodiments of the dynamically loaded plugin architecture, a violation may be indicated if a service invoked from the first child context contains a strong reference to a plugin class or if the first plugin returns a plugin object that belongs to a second plugin. "Class" refers to a programming model of a concept. In object-oriented programming, a class is a definition of an object's behavior and properties, and an object is an instance of a particular definition.

In the aforementioned example embodiments of the dynamically loaded plugin architecture, a child context may indicate whether an associated plugin is loaded. Alternatively, a plugin may invoke a timed action or an event-based action to indicate whether the plugin is loaded.

BRIEF DESCRIPTION OF SEVERAL VIEWS OF THE DRAWINGS

FIG. 6 is a block diagram of plugins having multiple configurations and multiple versions in a dynamically loaded plugin architecture according to one or more example embodiments of the present disclosure.

DETAILED DESCRIPTION

The present disclosure describes one or more systems, methods, routines, techniques and/or tools for designing and using a dynamically loaded plugin architecture (DLPA). To overcome the limitations of current plugins, the DLPA may use a context hierarchy for loading and unloading plugins. Within this context hierarchy, the DLPA may check for the existence of loaded plugins and compare plugin versions that may include conflicting context requirements. Different versions of the plugin may expect different information to be present in the context, or that information is organized in different ways.

Figure 1:
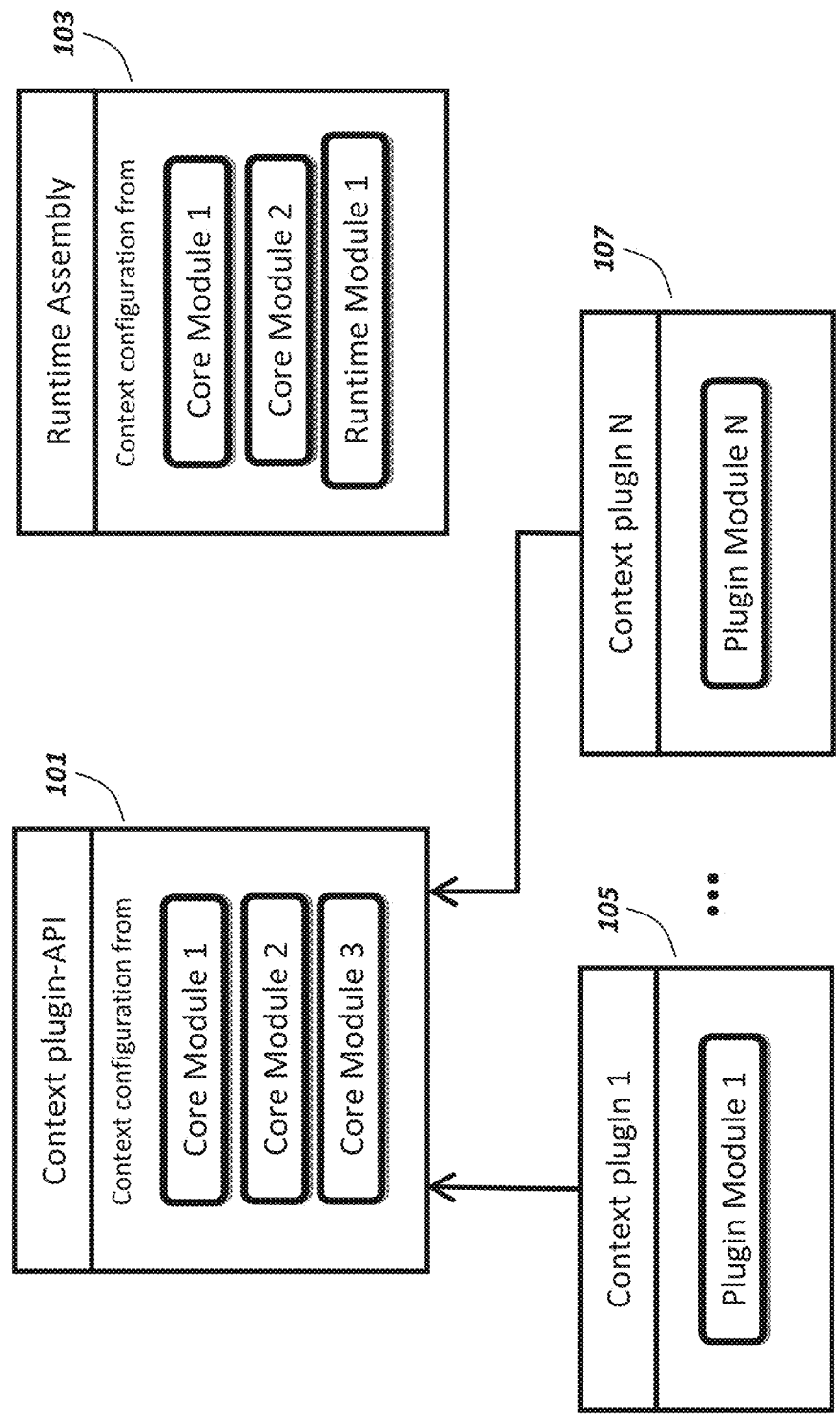
FIG. 1 is a block diagram of a dynamically loaded plugin architecture comprising multiple plugins according to one or more example embodiments of the present disclosure.

FIG. 1 is a block diagram of a DLPA comprising multiple plugins according to one or more example embodiments of the present disclosure. The DLPA in FIG. 1 comprises a parent 101, a runtime assembly 103, and two or more plugins (illustrated as plugin 1 105 through plugin N 107). The context container of the parent 101 may define one or more reusable software components. The arrows in FIG. 1 show a parent-child relationship. For example, plugin 1 105 and plugin N 107 are children of the parent 101. A child plugin, for example 105 and/or 107, inherits context from the parent 101. The inherited context container comprises properties and reusable software components from the parent 101. The child 105 and 107 may override but not replace the inherited context.

The parent 101 in FIG. 1 is illustrated as plugin application programming interface (API). The context container and its data for the plugin-API 101 may be created during an initialization step and may be independent and different from the context container and its data of the runtime assembly 103. Open application programming interfaces (APIs) provide a standard interface, allowing third parties to create plugins that interact with the host application. A stable API allows third-party plugins to continue to function as the host application changes. The context container for the plugin-API 101 may use the assemblies loaded by an assembly definition loader. However, the context container for the plugin-API 101 will not typically use the underlying executing instance of a virtual machine, operating system thread, or processing task which is responsible for the execution of the plugins 105 and 107 and the mapping of the plugins 105 and 107 onto specific computing resources. Systems running in different languages may use a different execution environment. For example, the execution environment may be a process thread in UNIX where the virtual machine is replaced by the runtime system library. Alternatively, the execution environment may be a Java Virtual Machine.

The DLPA may comprise a plugin repository. The plugin repository may store one or more plugins. When a plugin is loaded, a child context is created dynamically. The child context is associated with the plugin and inherits the one or more reusable software components from the parent context container. The plugin repository has the ability to upload, download, and query and requisition plugins. The plugin repository may also store plugin assemblies and files of required libraries and resources. The plugin repository provides a mechanism to configure of plugins, thereby enabling a user to query: 1) plugin names; 2) current versions of all enabled plugins; 3) versions of a particular plugin; and/or 4) plugin definitions of a particular version of a particular plugin.

Individual contexts for plugins may be created dynamically during a plugin load. Individual contexts may also use a corresponding instance (as defined below) of a plugin assembly for loading classes and resources. A single plugin configuration or description source may be specified in a plugin manifest that may include a description of the plugins available to a system. The plugin configuration may be implemented using a textual description using a domain specific language such as but not restricted to XML, or any other appropriate metadata configuration mechanism such as notations or annotations inserted into the executable binary code. This configuration data may or may not be available during the execution of the program.

Within the context hierarchy, a second child context may inherit the one or more reusable software components from the parent context or from the first child context when the second plugin is loaded.

A child context may indicate whether an associated plugin is loaded. Alternatively, a timed action or an event-based action invoked by a plugin may indicate whether the plugin is loaded. Plugins 105 and 107 may: 1) obtain information about their implementation from the plugin-API 101; 2) obtain information about their implementation from specific instructions integrated into the plugin itself when it is created using any methods (e.g., automatic resolution of inter-component dependencies to specific or alternate implementations and contexts); 3) obtain properties and values defined in the plugin-API 101; 4) obtain properties and values defined in an instance or reference to the plugin itself; 5) override configurations defined in the plugin-API 101, but only for the local use (e.g., the local execution scope), as the changes will not be visible for other contexts (e.g., other plugins); and/or 6) implement different versions of assemblies or its alternatives to obtain correct context instances.

The global parent description may not be used by plugins, as it points to a shared, global plugin-API context. Each plugin uses its own individual context. Violation may be indicated if a service invoked from the first child context contains a strong reference to a plugin class or if the first plugin returns a plugin object that belongs to a second plugin.

The DLPA is operable to enable dynamic loading and unloading of plugins. For example, the DLPA may upgrade an existing plugin, add a new plugin and remove an existing plugin. Version control of the upgrades and compatibility assessment of the new plugins may be managed by the DLPA. The DLPA may also support autowiring, declarative configuration, annotation-based contexts, and/or loading of resources and properties. Autowiring refers to a method for finding compatible running software components and injecting the executable components into the running system.

The DLPA has the ability to: 1) enable or disable plugins; 2) select one of the available versions of a plugin as the current version; 3) watch for changes in a plugin configuration; 4) add a new version of a plugin; 5) add a new plugin; and 6) completely remove a plugin version, or all versions of a plugin, or all plugins at once.

Figure 2:
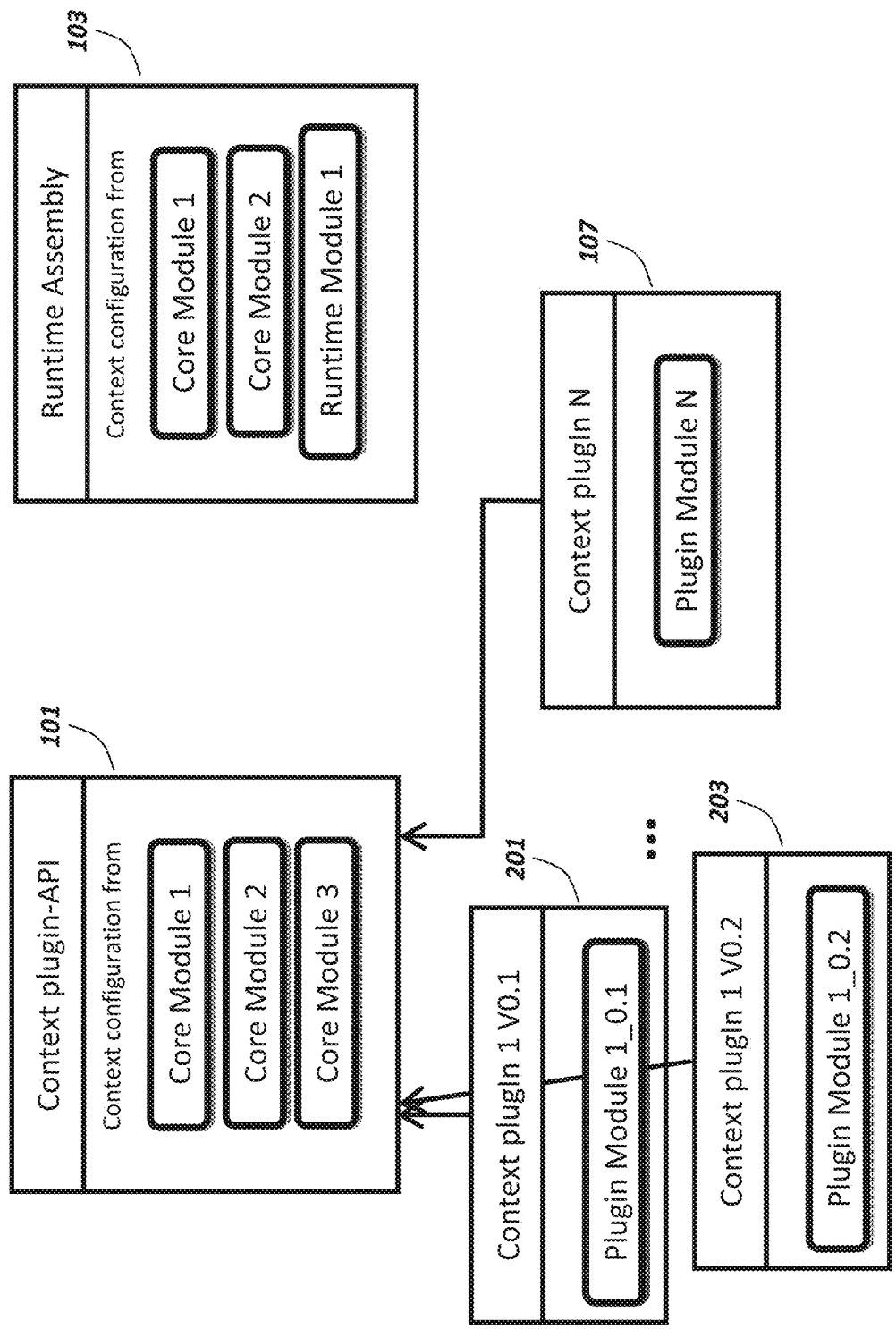
FIG. 2 is a block diagram of a dynamically loaded plugin architecture comprising multiple versions of the same plugin according to one or more example embodiments of the present disclosure.

FIG. 2 is a block diagram of a DLPA comprising multiple versions of the same plugin according to one or more example embodiments of the present disclosure. The DLPA in FIG. 2 comprises a plugin application programming interface (API) 101, a runtime assembly 103, plugin N 107 and multiple versions of the same plugin executing simultaneously (plugin 1 V0.1 201 and plugin 1 V0.2 203).

Plugin 1 is loaded and a first child context is created dynamically, thereby generating plugin 1 V0.1 201. Plugin 1 is loaded a second time, while plugin 1 V0.1 201 remains loaded. Then, a second child context is created dynamically, thereby generating plugin 1 V0.2 203. The two versions of plugin 1 201 and 203 may run concurrently as two independent plugins.

Figure 3:
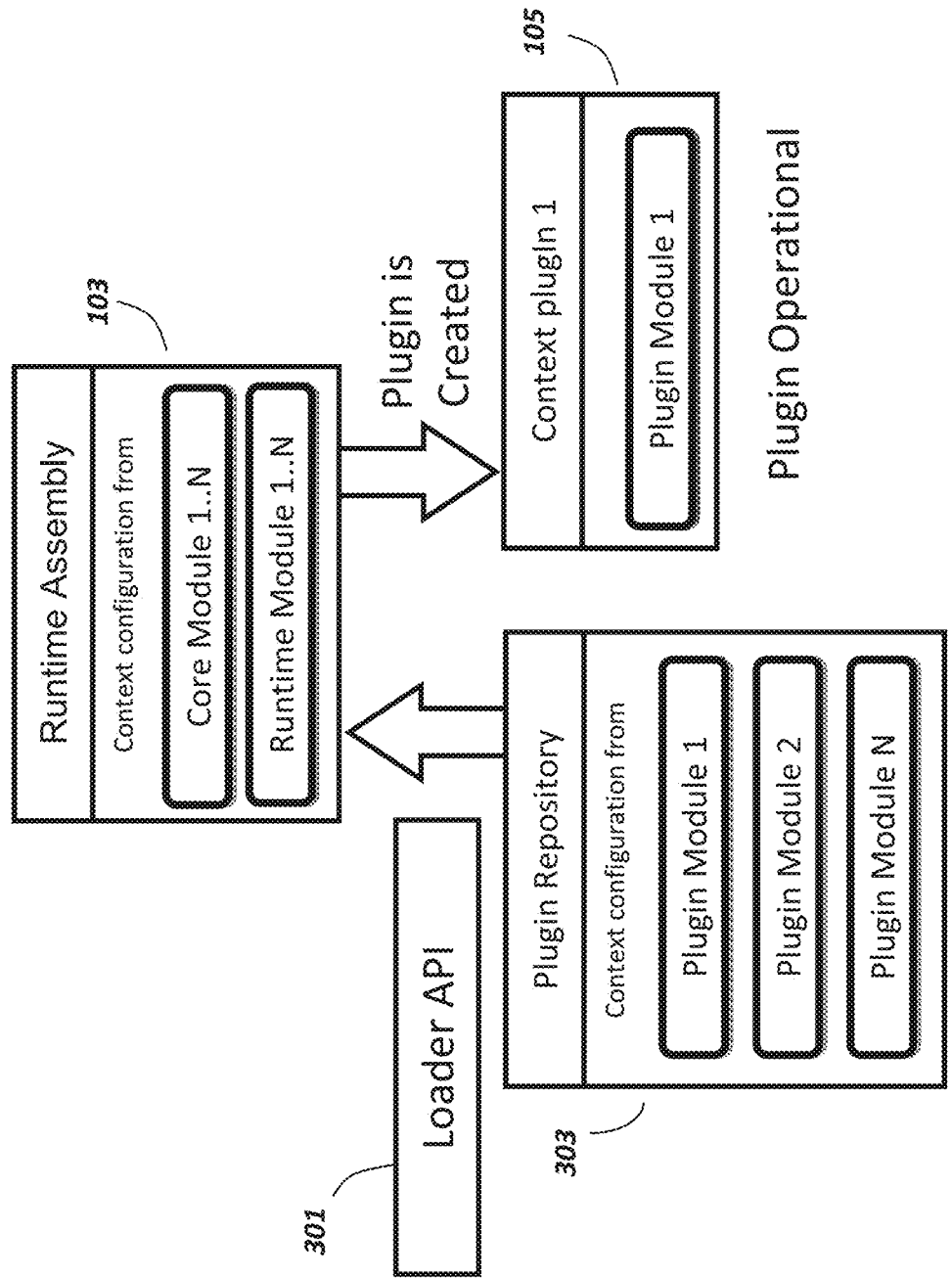
FIG. 3 is a block diagram of loading a plugin in a dynamically loaded plugin architecture according to one or more example embodiments of the present disclosure.

FIG. 3 is a block diagram of loading a plugin in a DLPA according to one or more example embodiments of the present disclosure. The loader API 301 allows for the definition of more than one version, or retrieval of the same plugin from the plugin repository 303. The runtime assembly 103 may instantiate a plugin 105 from the repository 303 whilst the system is still running. The repository may comprise a specification of what the plugin should be, together with a mechanism to access its initial state.

When the system starts up, the runtime assembly 103 is in an initialization phase, and may not have any plugins loaded. During the initialization, it may receive a "Load Request," either from an external system (not shown) or from some internal configuration program. In response to this Load Request, the plugin runtime assembly 103 instantiates a new plugin 105. This plugin 105 inherits its definition and state from the context of the runtime assembly 103, and also adds to this its own context. Now, the system comprises both the runtime assembly 103, and the plugin 1 105.

While FIG. 3 depicts the loading of only one plugin, many plugins (including but not limited to multiple versions of the same plugin), may be loaded and run concurrently. Plugins may communicate with each other, or only with the core runtime assembly 103.

Figure 4:
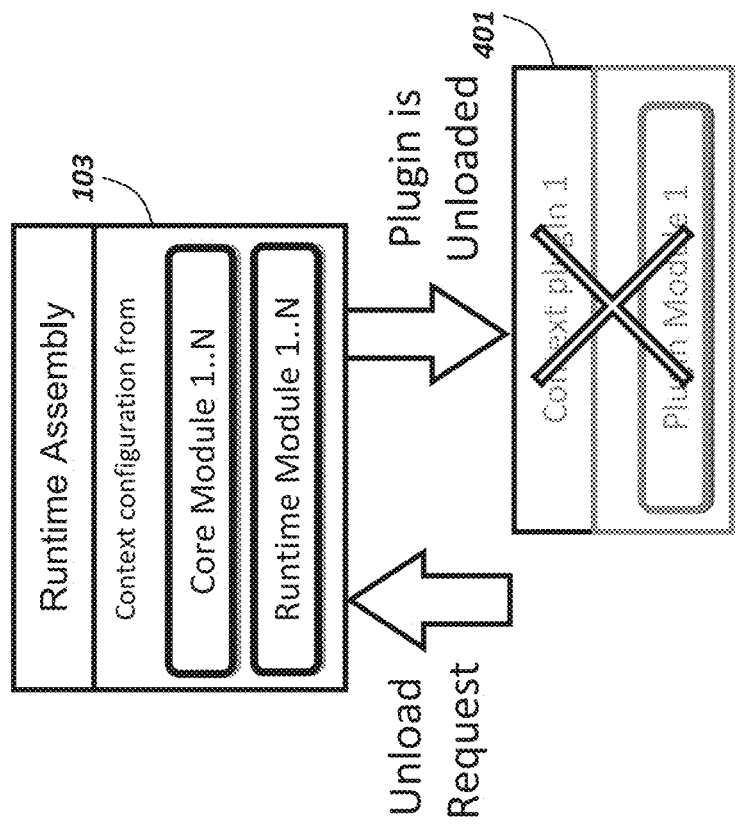
FIG. 4 is a block diagram of unloading a plugin in a dynamically loaded plugin architecture according to one or more example embodiments of the present disclosure.

FIG. 4 is a block diagram of unloading a plugin in a DLPA according to one or more example embodiments of the present disclosure. The runtime assembly 103 can unload (or remove) a plugin 401 from the repository whilst the system is still running.

Figure 5:
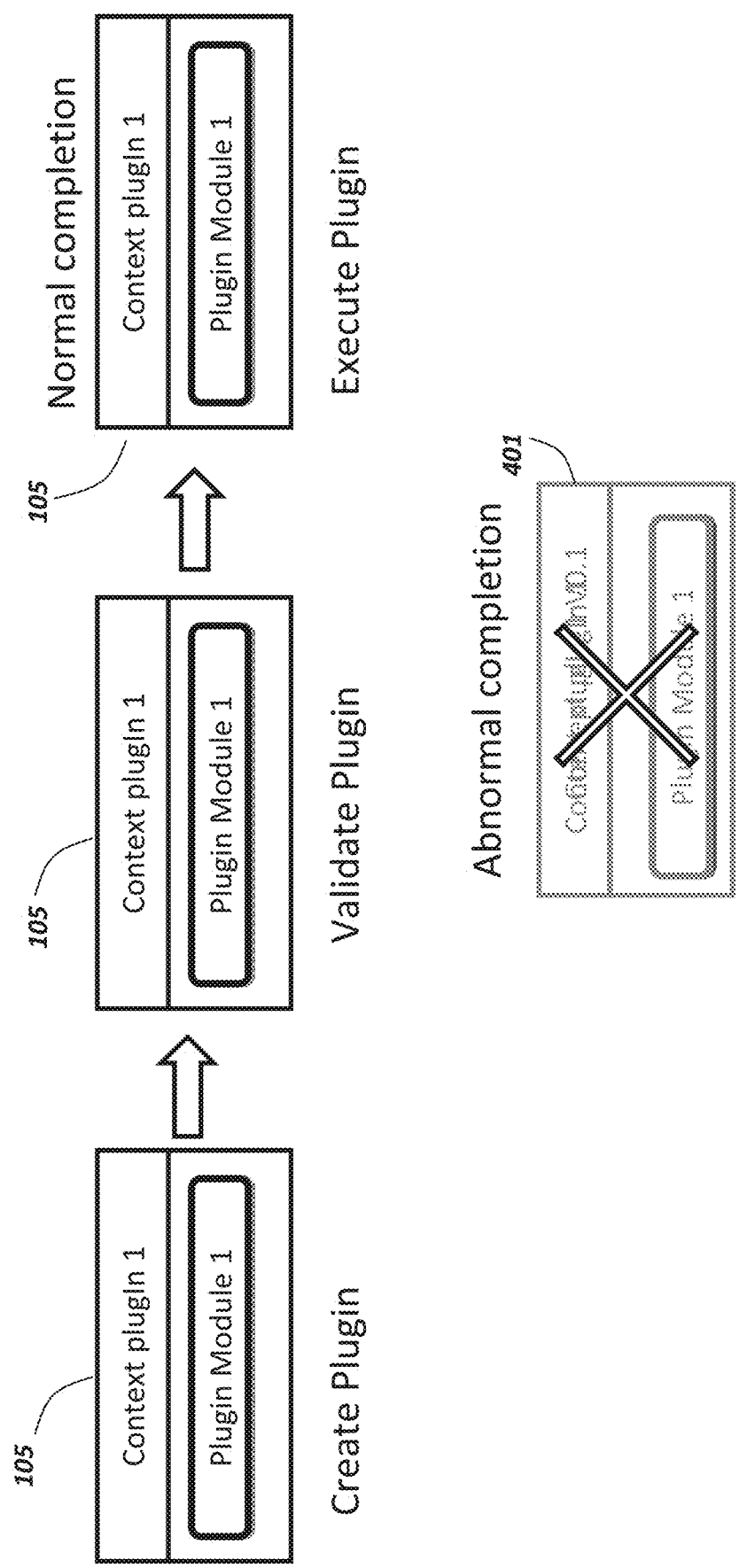
FIG. 5 is a block diagram of normal and abnormal completion of the act of loading a plugin in a dynamically loaded plugin architecture according to one or more example embodiments of the present disclosure.

FIG. 5 is a block diagram of normal and abnormal completion of a plugin in a DLPA according to one or more example embodiments of the present disclosure. The subject matter of FIG. 5 may be referred to as a plugin lifecycle. During normal completion, the plugin 105 may be created, validated and executed. During abnormal completion, the plugin 401 may be destroyed and an error may be indicated. The lifecycle of a specific invocation of a plugin is independent of the lifecycle of: another plugin of the same type but a different version, another plugin of the same type but with a different configuration and another plugin of a different type, where type is defined below.

FIG. 6 is a block diagram of plugins having multiple configurations and multiple versions in a DLPA according to one or more example embodiments of the present disclosure. A first configuration, Configuration A, may have multiple versions, e.g., plugin 1A_0.1 601 and plugin 1A_0.2 603. Likewise, a second configuration, Configuration B, may have multiple versions, e.g., plugin 1B_0.1 605 and plugin 1B_0.2 607. FIG. 6 illustrates that a plugin has a type, a version and a configuration. The type reflects the core code base of the plugin, e.g., plugin 1. The version represents evolutionary changes to that code, for reasons of improving performance, extending features or fixing bugs. However, in operational use each plugin may have its own independent runtime configuration, that allows it perform differently than another plugin of the same type or even the same version.

The architecture describe herein allows for plugins with any possible mixture of version, type or configuration to run concurrently or sequentially within the same system. The executing combination of type, version and configuration is called an "Instance" and is identified by a plugin instance identifier PGID. However, plugins are uniquely identified by their type, version and configuration, and the system may be configured that two exactly identical combinations may not be loaded simultaneously. This is optional, and under certain circumstances exactly identical combinations may be loaded simultaneously and are identified by additional information in their PGID values.

Aspects of the present disclosure may be embedded and/or embodied in a program, which comprises features enabling the implementation of the embodiments described herein, and which when loaded in a computer system is able to carry out these embodiments. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system comprising:
   a container comprises a hardware processor and executable code within a host application, the container is operable to store a plurality of plugins, wherein:
   a plugin is operable to add a feature to the host application,
   each plugin of the plurality of plugins is operable to independently configure one or more models,
   a first plugin of the plurality of plugins is operable to inherit one or more software components from a parent plugin of the plurality of plugins, a second plugin of the plurality of plugins is operable to inherit one or more software components from the first plugin, wherein the first plugin is a first version of the first plugins, and the second plugin is a second version of the first plugin, and the container is operable to run the first plugin independently from and concurrently with the second plugin, and
   the container is operable to indicate a violation if the second plugin invokes a service that returns a model configured by the first plugin.

2. The system of claim 1, wherein the container is on a server.

3. The system of claim 1, wherein the parent plugin is defined by an application programming interface (API).

4. The system of claim 1, wherein each plugin of the plurality of plugins is uniquely identified by a version.

5. The system of claim 4, wherein the container is operable to run a first version of the first plugin independently from and concurrently with a second version of the first plugin.

6. A non-transitory computer-readable storage medium storing instructions which, when executed by one or more processors, provides a plugin architecture, the plugin architecture comprising:
   a container operable to store a plurality of plugins, wherein:
   a plugin is operable to add a feature to a host application,
   each plugin of the plurality of plugins is operable to independently configure one or more models,
   a first plugin of the plurality of plugins is operable to inherit one or more software components from a parent plugin of the plurality of plugins, a second plugin of the plurality of plugins is operable to inherit one or more software components from the first plugin, wherein the first plugin is a first version of the first plugins, and the second plugin is a second version of the first plugin, and the container is operable to run the first plugin independently from and concurrently with the second plugin, and the container is operable to indicate a violation if the second plugin invokes a service that returns a model configured by the first plugin.

7. The plugin architecture of claim 6, wherein the container comprises executable code within the host application.

8. The plugin architecture of claim 6, wherein the container comprises a hardware processor.

9. The plugin architecture of claim 6, wherein the container is on a server.

10. The plugin architecture of claim 6, wherein the parent plugin is defined by an application programming interface (API).

11. The plugin architecture of claim 6, wherein each plugin of the plurality of plugins is uniquely identified by a version.

12. The system of claim 11, wherein the container is operable to run a first version of the first plugin independently from and concurrently with a second version.

13. A method performed by one or more processors for loading plugins, the method comprising:
    storing a plurality of plugins in a container;
    loading a first plugin of the plurality of plugins, wherein the first plugin is a first version of the first plugin, the first plugin is operable to:
        inherit one or more software components from a parent plugin,
        add a feature to a host application, and
        independently configure one or more models of the first plugin;
    loading a second plugin of the plurality of plugins, wherein the second plugin is a second version of the first plugin, the second plugin is operable to:
    inherit one or more software components from the first plugin,
    add a feature to the host application, and
    independently configure one or more models of the second plugin;
    running the first plugin independently from and concurrently with the second plugin; and
    indicating a violation if the second plugin invokes a service that returns a model of the first plugin.

14. The method of claim 13, wherein the container comprises executable code within the host application.

15. The method of claim 13, wherein the container comprises a hardware processor.

16. The method of claim 13, wherein the container is on a server.

17. The method of claim 13, wherein the parent plugin is defined by an application programming interface (API).

18. The method of claim 13, wherein the first plugin and the second plugin are each uniquely identified by a version.

19. The method of claim 18, wherein the method comprises running a first version of the first plugin independently from and concurrently with a second version of the first plugin.

* * * * *